Patented Dec. 24, 1940

2,226,118

UNITED STATES PATENT OFFICE 2,226,118

PROCESS FOR RESOLVING PETROLEUM EMULSIONS

Melvin De Groote, University City, Mo., assignor to Petrolite Corporation, Ltd., Wilmington, Del., a corporation of Delaware No Drawing. Application August 18, 1939,
Serial No. 290,762

4 Claims. (Cl. 252—332)

This invention relates primarily to the treatment of emulsions of mineral oil and water, such as petroleum emulsions, for the purpose of separating the oil from the water.

One object of my invention is to provide a novel process for resolving petroleum emulsions of the water-in-oil type, that are commonly referred to as "cut oil," "roily oil," "emulsified oil," etc., and which comprise fine droplets of naturally occurring waters or brines dispersed in a more or less permanent state throughout the oil which constitutes the continuous phase of the emulsion, my process being particularly adapted to the resolutions of crude oil emulsions of the kind obtained in connection with the treatment or the flooding of subterranean, oil-bearing strata by means of aqueous agents or the like.

Another object of my invention is to provide an economical and rapid process for separating emulsions which have been prepared under controlled conditions from mineral oils, such as crude petroleum and relatively soft waters or weak brines. Controlled emulsification and subsequent demulsification under the conditions just mentioned is of significant value in removing impurities, particularly inorganic salts, from pipeline oil.

The demulsifying agent employed in my process is a new compound or composition of matter, consisting of a certain kind of salt derived from an available hydroxylated amine of the kind hereinafter described and an alkylated naphthalene sulfonic acid of the kind in which there is at least one alkyl group substituted in the naphthalene nucleus, the said alkyl group or groups, in turn, being characterized by containing at least three carbon atoms and not more than ten carbon atoms. Said alkylated sulfonic acid can be described by the following formula D(SO₃H)n, in which n indicates any small whole numbers, such as 1, 2, or 3; but generally speaking, the monosulfonic acid would be employed, and for purposes of brevity, the formula D.SO₃H will be used.

If sulfonic acid of the kind typified by the formula D.SO₃H is neutralized with an amine, such salt may be indicated by the formula

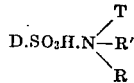

in which T represents the conventional hydrocarbon radical, R and R' may be the same, or may represent an hydrogen atom.

Needless to say, a large number of amines exemplified by many types are available. In the majority of instances when an alkyl-aryl sulfonic acid is neutralized with an amine, it is quite likely that the amine salt, so obtained, will not be as effective a demulsifier as the alkyl-aryl sulfonic acid itself, or the alkali metal salt, such as the sodium salt, potassium salt, or ammonium salt. However, I have discovered that when alkyl-aryl sulfonic acids of the kind hereinafter described in detail are neutralized with a certain particular type of amine, one obtains a demulsifier of unusual effectiveness, and in fact, one which is more effective, in many instances, than the alkyl-aryl sulfonic acid from which it was obtained, or the corresponding sodium, potassium or ammonium salt. As far as I am aware, the particular amine employed for neutralization is without value in regard to demulsifying action, when employed by itself. The effectiveness appears to reside in some unexplainable action or structure which appears in the amine salt. The particular type of amine employed to neutralize the alkyl-aryl sulfonic acids is of the kind exemplified by the following formula:

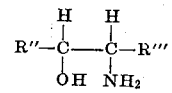

in which R'' and R''' may represent any organic radical, as, for example, alkyl, aryl, aralkyl, or one of these radicals may represent hydrogen.

One method of preparing such amines is to employ certain particular types of feed materials, as, for example, from high molecular weight unsaturated aliphatic petroleum compounds from cracked petroleum wax or paraffin wax, crude scale wax, slack wax, petroleum wax, or from solvent extracts of cracked petroleum fractions or similar raw materials. Briefly stated, such materials can be classed generically as olefinic distillate boiling in the range of 200° F. to 700° F. and prepared by cracking higher boiling paraffinic hydrocarbons of a petroleum source. Such procedure is well known, and the manufacture of such primary hydroxy amines is described in United States Patent No. 2,160,138, dated May 30, 1939, to Gaylor. It is to be noted, however, that some cracked wax has a boiling point as low as 90° F. and is high in olefinic character and is suitable for the type of reaction employed in preparation of such amine. As to such olefinic cracked wax (90–350° F. fraction), see United States Patent No. 2,162,269, dated June 13, 1939, to Mikeska.

Obviously, it is immaterial whether the selective olefines employed in the manufacture of the primary hydroxy amine is obtained by a cracking process, or by the reverse process, that is, a polymerization process. For instance, the afore-mentioned United States Patent No. 2,162,269 describes both classes of olefines, to wit, the olefine distillates obtained by cracking and having a range as low as 90–350° F., and also polymers having a molecular weight above 100 and produced by polymerizing normally gaseous olefines into a low molecular weight acyclic liquid having a molecular weight above 100, and preferably between 100 and about 224.

For the sake of brevity, reference is made to the detailed procedure which is found in said aforementioned United States Patent No. 2,160,138, and is repeated verbatim.

"A petroleum paraffin wax containing paraffin hydrocarbons having from 10 to 35 carbon atoms per molecule, averaging about 24 carbon atoms, was cracked in the liquid phase at a temperature of about 750° F., under a pressure of about 50 lbs. The cracked distillate was then distilled and the fraction boiling in the range from about 500° F. to 1,000° F. was segregated. This material had an unsaturated content of about 50 to 60%.

"This cracked wax fraction was then treated with urea chloride at approximately room temperature with vigorous stirring. The chlorinated product was then treated with anhydrous ammonia at about 120° F., under pressure. The hydroxy amines were recovered from the reaction mixture through their hydrochlorides and a yield of 10% based on the cracked wax was obtained."

As an alternate procedure, the cracked wax fraction above described may be replaced by a suitable amount of low molecular weight acyclic liquid products having a molecular weight between 100 and 224 and obtained by polymerizing normal gaseous olefines.

The products so derived are primary amines. Thus, if desired, they could be converted into secondary or tertiary amines, or mixtures thereof, by conventional processes commonly employed to so convert ordinary primary alkylamines into secondary amines, or tertiary amines, or mixtures thereof. For instance, such amines could be reacted with methyl iodide, propyl iodide, benzyl chloride, cetyl bromide, or any one of a number of suitable alkylating agents, so as to yield basic secondary or tertiary amines, or mixtures thereof, or mixtures containing in addition some primary amines. I have not found any advantage in so converting the amine, and in fact, there is a disadvantage, in that it is a relatively expensive step; and if the hydrocarbon group introduced, for instance, an alkyl group, is of fairly high molecular weight, as, for example, in the case of a cetyl group, there may be some decreased effectiveness in the demulsifying agent prepared from such amine, as compared with the primary parent amine prior to alkylation. It is understood that, although any amine derived in the manner previously described may be employed, yet the preferable procedure is to employ the primary amine, especially for reasons of economy. As has been previously indicated, these amines are employed to neutralize alkyl-aryl sulfonic acids of the kind hereinafter described in detail, in order to obtain the demulsifying agent employed in the present process.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the particular salts used to produce the demulsifier employed in my process consists in converting the naphthalene into either the alpha or beta naphthalene sulfonic acid, or a mixture of the same, or in some instances, into a di- or even a tri-sulfonic acid, or a tetrasulfonic acid, or a mixture of the various types. In most instances there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, a butyl alcohol, an amyl alcohol, a hexyl alcohol, a decyl alcohol, etc., is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the dialkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described, into the aromatic nucleus, one could also introduce an alkyl residue from some other alcohol, as, for example, an alkylated group derived from ethyl or methyl alcohol, or one might introduce a group derived from an aryl, aralkyl, cyclic, or hydroaromatic alcohol, or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other group present, such as methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lower in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed as the demulsifier in the present process. For instance, although the sulfonic group may be introduced into either the alpha or beta position, it is manifest that the alkyl group or groups can be introduced into various positions in regard to the position of the sulfonic acid residue. Apparently, as far as I am aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is my preference to produce my reagents from these alcohols, and in some instances, it is desirable to introduce different alkyl groups, such as a propyl group and butyl group, into the same sulfonaphthalene residue.

In the actual manufacture of alkylated naphthalene sulfonic acids, the composition of the desired chemical reaction is followed by a washing process which removes the excess of sulfuric acid or other sulfonation, sulfation, or condensation reagent employed. The acidic mass thus obtained is neutralized in any convenient manner with any suitable base, such as caustic soda, caustic potash, ammonium hydroxide, and the like. However, in accordance with what has been said herein, the acidic mass is neutralized with the amine of the kind previously described. The final product, if it represents a pasty or semi-solid or solid mass, is rendered suitable for industrial use by the addition of a solvent, such as water, and alcohol, a coal tar solvent, a petroleum hydrocarbon solvent, or the use of any other suitable solvent, such a phenolic body, or a chlorinated hydrocarbon.

In manufacturing or producing the demulsifier above described, I prefer to obtain a chemical compound by reaction so conducted that three molecules of isopropyl alcohol are united with one molecule of naphthalene by the customary sulfation, sulfonation, and condensation reactions. The resulting mixture consists largely of di-proyl naphthalene sulfonic acids and tri-propyl naphthalene sulfonic acids, with possibly small amounts of mono-propyl sulfonic acids and tetra-propyl sulfonic acids present. Generally speaking, it is easier to conduct the reaction so that the bulk of the sulfonic acid represents the beta type, although the alpha type may be produced, if desired. The product is neutralized with a hydroxy amine of the kind typified by examples of the kind previously described. The product so obtained is diluted with one or more solvents, so as to reduce its viscosity to that of ordinary castor oil, or slightly greater. The solvents which I preferably employ are a mixture of two or more of the following: Water, denatured alcohol, kerosene, or tar acid oil.

Among the reagents which are particularly effective are the salts formed by reaction between the amines of the kind previously described, particularly the amines derived from the polymolecular olefines and the following alkylated naphthalene sulfonic acids, i. e., mono-isoproyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl naphthalene sulfonic acids, di-isopropyl mono-amyl naphthalene sulfonic acids, mono-isopropyl mono-hexyl naphthalene sulfonic acids, etc.

In such instances where there is present more than one sulfonic acid radical, as in the formation of a disulfonic acid, or a tri-sulfonic acid, or a tetrasulfonic acid, if desired, all the sulfonic radicals may be neutralized with amines of the kind previously described, or some of the sulfonic acid radicals may be neutralized with some other suitable base, such as a sodium hydroxide, potassium hydroxide, ammonium hydroxide, etc., provided that at least one sulfonic acid radical has been neutralized by amines of the kind previously described.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc, may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, complex amine type, the petroleum sulfonate type, the alkylated sulfo-aromatic type, neutralized in the conventional manner, or even un-neutralized.

Incidentally, neutralization of the alkylated sulfonic acid with the amine of the kind previously described need not take place in stoichiometrical relationship, but one may employ an excess of the sulfonic acid or of the amine.

Incidentally, salts of the kind herein contemplated need not be made by direct neutralization, but, of course, can be produced just as effectively by some other means. For instance, a double decomposition reaction may be utilized, i. e., the amine hydrochloride and the sodium or potassium salt of the sulfonic acid might each be dissolved in a hydrophobe solvent, such as an alcohol, and mixed with the separation of sodium or potassium chloride, which could be filtered off and the alcohol evaporated, so as to leave the amine salt of the kind desired.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubedly have solubility within the concentration employed. This same fact is true in regard to the material or materials employed as the demulsifying agent of my process.

It is to be noted that the increased effectiveness which the amine of the kind described permits or creates in the sulfonic acid does not appear in other comparable neutralizations of acidic demulsifying agents. Large varieties of materials which are acidic in nature have been suggested for demulsification, either in the acidic state, or after neutralization. The neutralization of many such materials, for instance, various sulfo derivatives derived from other hydrocarbon sources, such as non-aryl, a rather inferior demulsifying agent, when neutralized with amines of the kind described, and particularly when compared with analogous sodium, potassium or ammonium salts. Furthermore, the neutralization of alkyl-aryl sulfonic acids of the kind described herein with many amines results in a compound having a considerably decreased effectiveness, when used as a demulsifier. For instance, aniline, toluidine, propylamine, diamylamine, triamylamine, etc., cannot be substituted for the amines employed for neutralization in the preceding examples, without detracting markedly from the value of the compounds obtained. In other words, if the same alkylated nephthalene sulfonic acids which are employed to produce the chemical compound previously described happened to be neutralized with at least certain other amines, such as those referred to, one apparently does not obtain a reagent of any marked value, and especially a reagent of any superiority or effectiveness for demulsifying oil field emulsions. Similarly, the applicant has experimented with a number of other sulfonic acids, such as certain ones derived from petroleum, and found that neutralization with amines of the kind herein described does not give nearly as effective a reagent, in many instances, as conventional neutralization with caustic soda, caustic potash, ammonium hydroxide, and the like. Based on the results of actual tests obtained in a variety of emulsified crudes occurring in a number of the major oil fields of the United States, the conclusion one must inevitably reach is, that the result obtained by uniting the two different residues, i. e., the amine residue of the kind described and the sulfo-aromatic residue of the kind described, in a single molecule, is an unlooked-for unique quality, which could not be foreseen by the present knowledge of the art and which produces a demulsifying agent that is particularly effective for a large number of emulsified crude oils.

In practising my process in regard to oil field emulsions, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described my invention, what I claim as new and desire to secure by Letters Patent is:

1. A process for breaking petroleum emulsions of the water-in-oil type, characterized by subjecting the emulsion to the action of a demulsifying agent, comprising a product of the kind derivable by neutralization reaction between: (A) an aliphatic hydroxy amine, in which the hydroxy group and the amino group of each molecule have been added to the double bond carbon atoms of olefines selected from the class consisting of acyclic olefinic distillate boiling in the range of 90° to 700° F. and prepared by cracking higher boiling paraffinic hydrocarbons of a petroleum source and low molecular weight olefinic acyclic liquid products having a molecular weight between 100 and about 224 and obtained by polymerizing normally gaseous olefines; and (B) an alkylated naphthalene sulfonic acid, in which at least one alkyl group substituted in the naphthalene nucleus contains at least three carbon atoms and not more than ten carbon atoms.

2. A process for breaking petroleum emulsions of the water-in-oil type, characterized by subjecting the emulsion to the action of a demulsifying agent, comprising a product of the kind derivable by neutralization reaction between: (A) a primary aliphatic hydroxy amine, in which the hydroxy group and the amino group of each molecule have been added to the double bond carbon atoms of olefines selected from the class consisting of acyclic olefinic distillate boiling in the range of 90° to 700° F., and prepared by cracking higher boiling paraffinic hydrocarbons of a petroleum source and low molecular weight olefinic acyclic liquid products having a molecular weight between 100 and about 224 and obtained by polymerizing normally gaseous olefines; and (B) an alkylated naphthalene sulfonic acid, in which at least one alkyl group substituted in the naphthalene nucleus contains at least three carbon atoms and not more than ten carbon atoms.

3. A process for breaking petroleum emulsions of the water-in-oil type, characterized by subjecting the emulsion to the action of a demulsifying agent, comprising a product of the kind derivable by neutralization reaction between: (A) a primary aliphatic hydroxy amine, in which the hydroxy group and the amino group of each molecule have been added to the double bond carbon atoms of olefines derived from low molecular weight olefinic acyclic liquid products having a molecular weight between 100 and about 224 and obtained by polymerizing normally gaseous olefines; and (B) an alkylated naphthalene sulfonic acid, in which at least one alkyl group substituted in the naphthalene nucleus contains at least three carbon atoms and not more than ten carbon atoms.

4. A process for breaking petroleum emulsions of the water-in-oil type, characterized by subjecting the emulsion to the action of a demulsifying agent, comprising a product of the kind derivable by neutralization reaction between: (A) a primary aliphatic hydroxy amine, in which the hydroxy group and the amino group of each molecule have been added to the double bond carbon atoms of olefines derived from low molecular weight olefinic acyclic liquid products having a molecular weight between 100 and about 224 and obtained by polymerizing normally gaseous olefines; and (B) an alkylated naphthalene sulfonic acid, in which at least one alkyl group substituted in the naphthalene nucleus contains at least three carbon atoms and not more than five carbon atoms.

MELVIN DE GROOTE.